United States Patent

[11] 3,601,904

[72] Inventors Leonard T. Elliott, Jr.
2895 N. Fulton Drive N.E., Atlanta, Ga. 30354;
Oliver B. Elliott, 516 Loreel Terrace, N.E., Atlanta, Ga. 30328; James B. Godwin III, Atlanta, Ga.
[21] Appl. No. 835,948
[22] Filed June 24, 1969
[45] Patented Aug. 31, 1971
[73] Assignee said Leonard T. Elliott, Jr. and said Oliver B. Elliott, by said Godwin

[54] MULTIPLE STUDENT TEACHING APPARATUS AND METHOD
4 Claims, 4 Drawing Figs.
[52] U.S. Cl. .................................................... 35/8 A, 84/470
[51] Int. Cl. ...................................................... G09b 5/06, G09b 15/00
[50] Field of Search ......................................... 35/8 A, 9, 5, 6, 35 C; 84/470, 478

[56] References Cited
UNITED STATES PATENTS

| | | | |
|---|---|---|---|
| 2,975,672 | 3/1961 | Shields ......................... | 35/35 C U |
| 3,001,431 | 9/1961 | Anderson ..................... | 84/470 X |
| 3,122,847 | 3/1964 | Redfield et al ............... | 35/35 C |
| 3,200,516 | 8/1965 | Parker .......................... | 35/35 C |
| 3,269,033 | 8/1966 | Redfield et al ............... | 35/35 C |
| 3,353,435 | 11/1967 | Schmoyer ..................... | 84/478 |
| 3,470,785 | 10/1969 | Shallenberger et al. ...... | 84/470 |

Primary Examiner—Wm. H. Grieb
Attorney—Newton, Hopkins & Ormsby

ABSTRACT: An audio-visual multiple student teaching method and device including a master control with a visual display device and means for relating the movement of the visual display device with a sound recording and a plurality of student headphones connected to the master control with input means for student inputs and means for superimposing audio signals from the student onto the signals from the sound recording in the student headphones.

MULTIPLE STUDENT TEACHING APPARATUS AND METHOD

BACKGROUND OF THE INVENTION

1. Field of the Invention

This invention relates generally to an audiovisual multiple student teaching method and device and more particularly to such a method and device in which an audio signal created by the student is superimposed of a master sound recording heard by the student.

2. Background of the Invention

Numerous audiovisual training aids are on the market today. These aids have provisions for each student to hear and see certain programmed information. Moreover, these aids may have means for providing an audio input into the system and then hear his input. These aids do not have facilities to superimpose the student's audio signal onto the master sound recording as is desirable for teaching certain types of information such as music when the student is trying to duplicate or complement the master recording with his audio input.

The prior art audiovisual training aids many times require a special compartmentalized room for operation. Moreover, such aids are frequently bulky and require extensive setup and removal time if it is necessary to change locations of the equipment.

SUMMARY OF THE INVENTION

These and other shortcomings of the prior art are overcome by the invention disclosed herein by providing a visual image displayed to the student while presenting a first audible signal from program material to the student and superimposing a second audible signal from the student himself onto the first audible signal so that the student not only hears the programmed information but also the audible signal that he creates at the same time. The invention is readily adapted for use in teaching students how to play musical instruments and the like.

Therefore, it is one of the objects of the invention to provide a student with a visual display while at the same time providing an audible signal from programmed material and superimposing an audible signal created by the student onto the audible signal from the programmed material.

Another object of the invention is to selectively provide to an instructor the audible signal created by each student.

Another object of the invention is to provide a teaching aid that is compact and easily portable.

A further object of the invention is to provide a teaching device complete within itself which requires no special construction at the location where it is used.

A still further object of the invention is to provide a teaching device that is simple in construction and inexpensive to produce.

The method of the invention comprises generally the steps of displaying a visual image to each of a plurality of students while simultaneous presenting a first audible signal to each student from programmed information and superimposing a second audible signal created by each individual student on the first audible signal presented to that individual student so that the second signal can duplicate or complement the first audible signal. The method also includes selectively presenting the second audible signal to an instructor to check the progress of the student. Also included is superimposing a third audible signal selectively created by the instructor onto the first and second audible signals presented to the student.

The apparatus of the invention includes generally a control module and a plurality of headphone sets operatively connectable to the control module. Each student has one of the headphone sets and the instructor operates the control module. The control module includes a projector for presenting the visual image to the students, a tape deck for presenting the programmed material to the student, and a control circuit connecting the projector, tape deck and headphone sets so that the projector is advanced in response to the programmed information. Each headphone set includes an input from the student and an amplifier circuit to superimpose the input from the student onto the programmed material being heard by that particular student. The control circuit in the control module includes a switching arrangement for selectively allowing the instructor to hear the input from each individual student and to impose an input created by the instructor onto the programmed material being heard by the students.

These and other objects, features, and advantages of the invention will become more clearly understood on consideration of the following specification and accompanying drawings wherein like characters of reference designate corresponding parts throughout the several views and in which:

These figures and the following detail description disclose specific embodiments of the invention, however, the inventive concept is not limited thereto since it may be embodied in other forms.

BRIEF DESCRIPTION OF ILLUSTRATIVE EMBODIMENTS

Figure 1:
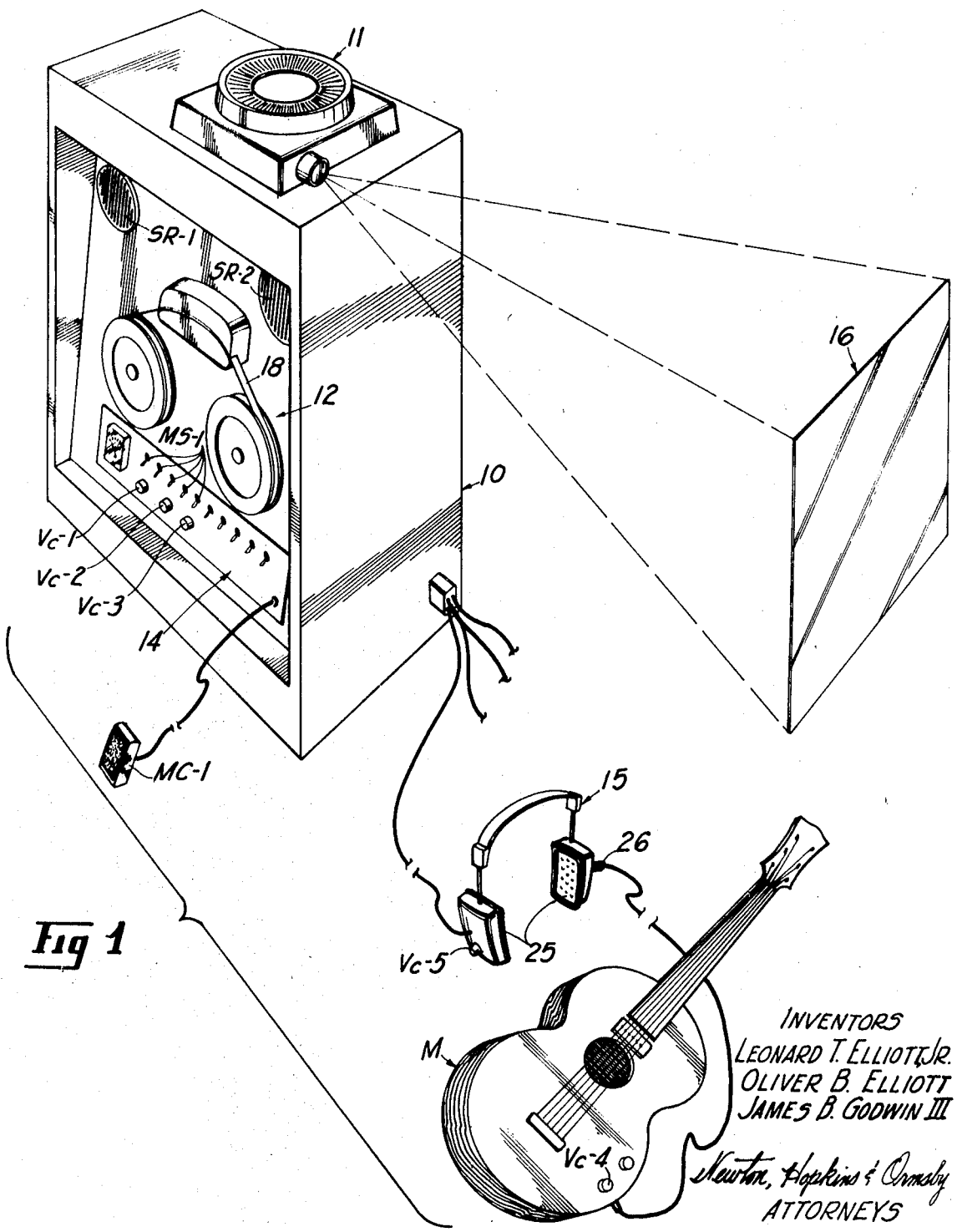
FIG. 1 is a perspective view showing one embodiment of the apparatus of the invention.

The apparatus of the invention comprises generally a master control module 10 with a projector 11 and a tape deck 12 as shown in FIG. 1. The module 10 also includes a switching and amplification circuit 14 which connects the tape deck 12 to the projector 11 to synchronize the movement of the projector with the programmed information carried by the tape deck. The apparatus also includes a headphone set 15 for each individual student connected to the control module.

The projector 11 and tape deck 12 are of conventional construction and readily available on the market today. The projector shown is a slide projector, however, other types of projectors such as filmstrip projectors may be used. The projectors 11 do have an electromechanical advance mechanism to move the projector to the next frame. The tape deck 12 is a stero or two channel tape deck however tape decks having different numbers of channels may be used.

The information to be visually displayed is carried by the projector on slides or filmstrips in a predetermined sequence as required by the order of presentation to the student. An appropriate display surface 16 is provided as shown in FIG. 1 to display the visual image to all the students at any one lesson. Of course more than one projector 11 and surface 16 may be provided if more students are being taught than can be handled by the one surface 16.

The first audible signal or programmed signal is recorded on a one channel of a two channel master program tape 18 carried by the tape deck 12. A synchronization signal is recorded on the other channel of the master program tape 18 to provide an appropriate input to the projector 11 to cause the next frame to advance to be displayed by the projector 11. The synchronization signal is so spaced on the tape 18 with relation to the first audible signal to cause the frames to be advanced in synchronization with selected portions of the first audible signal.

Figure 2:
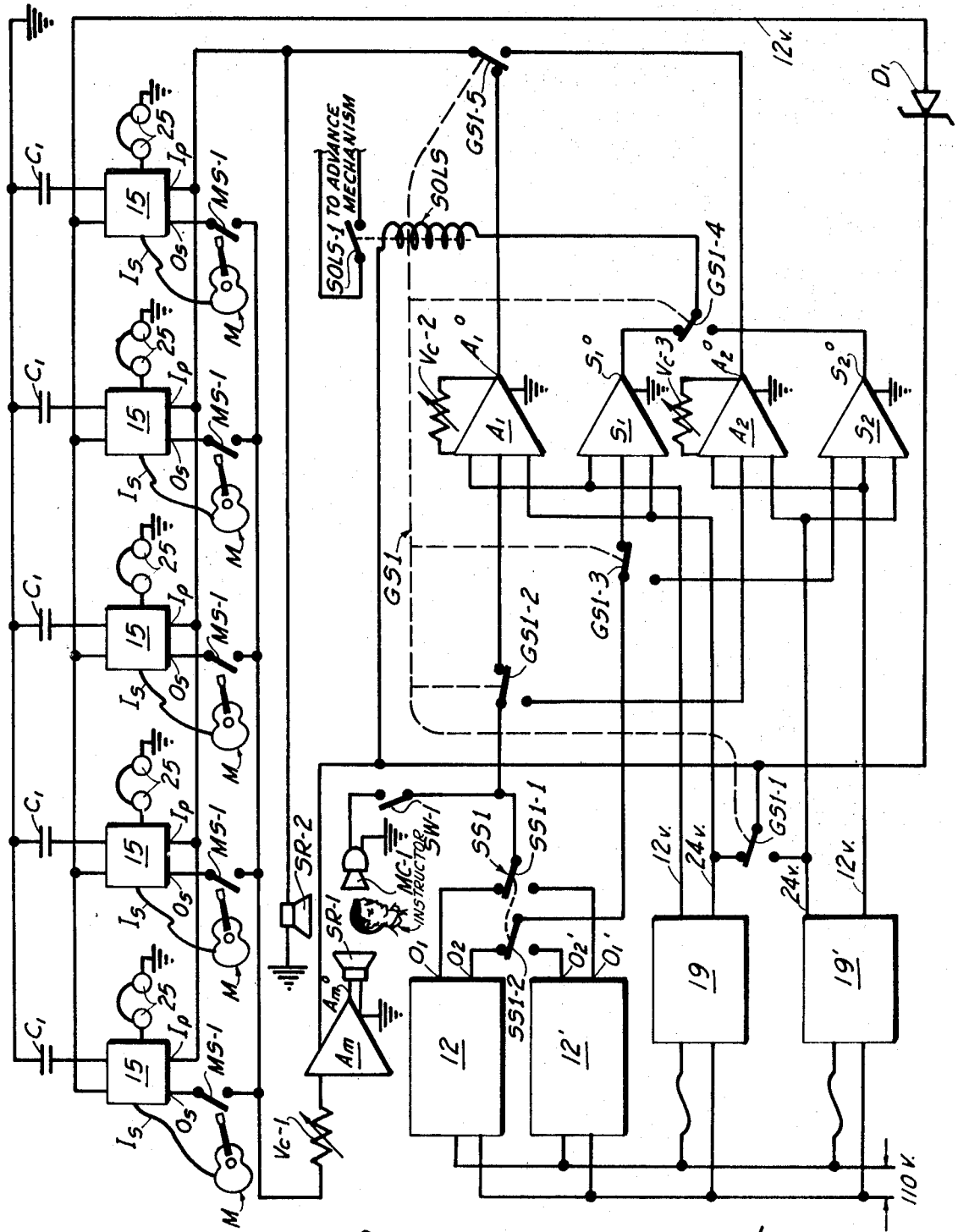
FIG. 2 is an electrical schematic drawing of that embodiment of the invention shown in FIG. 1.
Figure 4:
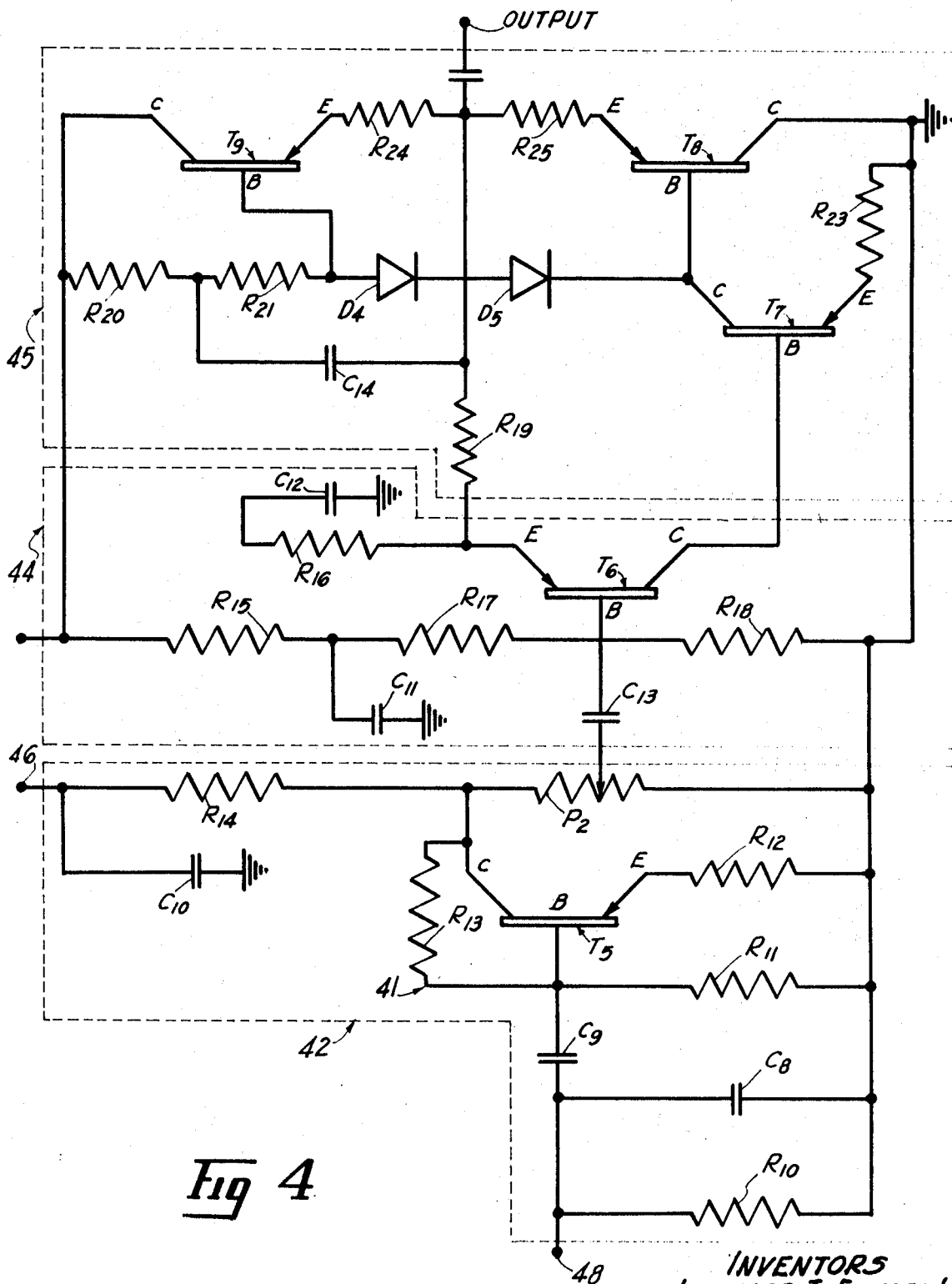

The switching and amplification circuit 14 is best seen by reference to FIGS. 2 and 4. The circuit 14 in FIG. 2 shows a dual system using two tape decks 12 and 12'. Also provided are a pair of audio amplifiers $A_1$ and $A_2$ as well as associated sync amplifiers $S_1$ and $S_2$. The amplifiers $A_1$ and $A_2$ have volume controls $V_c$-2 and $V_c$-3 respectively.

Tape deck 12 has an output $0_1$ and an output $0_2$, the output $0_1$ being associated with the program channel of tape 18 on deck 12 and output $0_2$ being associated with synchronizing channel of tape 18 on deck 12. Likewise, tape deck 12' has an output $0_1'$ and an output $0_2'$, the output $0_1'$ being associated with the program channel of a tape 18' on deck 12' and output $0_2'$ being associated with the synchronization channel of the tape 18'. Output $0_1$ and $0_2$ may be selectively connected to amplifiers $A_1$ and $S_1$ respectively or to amplifiers $A_2$ and $S_2$ respectively through contacts GS1–2 and contacts GS1–3 of gang switch GS1. Contacts GS1–2 selectively connect output $0_1$ to audio amplifiers $A_1$ or $A_2$ and contacts GS1–3 selectively connect output $0_2$ to sync amplifiers $S_1$ or $S_2$. Contacts GS1–2 are connected to contacts GS1–3 so that when output $0_1$ is connected to amplifier $A_1$, output $0_2$ is connected to amplifier $S_1$ and likewise for amplifiers $A_2$ and $S_2$.

A selector switch SS1 is provided for selectively connecting outputs $0_1$ and $0_2$ or outputs $0_1'$ and $0_2'$ through contacts GS1–2 and GS1–3 respectively. Contacts SS1–1 of switch SS1 selectively connect outputs $0_1$ or $0_1'$ to GS1–2 and contacts SS1–2 of switch SS1 selectively connect outputs $0_2$ or $0_2'$ to contacts GS1–3 with contacts SS1–1 connecting output $0_1$ to contacts SS1–2 when connects output $0_2$ to contacts GS1–3 and likewise for outputs $0_1'$ and $0_2'$. This arrangement then, allows one tape deck to be in use while the other serves as a standby or is being loaded or vice versa. Likewise amplifiers $A_1$ and $S_1$ can be used while amplifiers $A_2$ and $S_2$ serve as a standby or vice versa. Power supply 19 supplies 24 volt operating power to amplifiers $A_1$ and $S_1$ and power supply 19 supplies 24 volt and a 12 volt operating power to amplifiers $A_2$ and $S_2$. Power supplies 19 and 19' as well as tape decks 12 and 12' are connected in parallel to a 110 volt power source.

The output $S_1^\circ$ of amplifier $S_1$ or the output $S_2^\circ$ of amplifier $S_2$ may be selectively connected to solenoid SOL of solenoid switch SOLS through contacts GS1–4 of gang switch GS1. Contacts GS1–4 are connected to contacts GS1–3 so that when outputs $0_2$ or $0_2'$ is connected to amplifier $S_1$, output $S_1^\circ$ will be connected to solenoid SOL and likewise when output $0_2$ or $0_2'$ is connected to amplifier $S_2$. When switch SOLS is activated, contacts SOLS—1 are closed to advance projector 11.

The output $A_1^\circ$ of amplifier $A_1$ or the output $A_2^\circ$ of amplifier $A_2$ may be selectively connected to the primary inputs $I_p$ of the plurality of headphone sets 15 in parallel through contacts GS1–5. Contacts GS1–5 are connected to contacts GS1–2 so that, when output $0_1$ or $0_1'$ is connected to amplifier $A_1$, output $A_1^\circ$ will be connected to inputs $I_p$ and likewise when output $0_1$ or $0_1'$ is connected to amplifier $A_2$.

Each headphone set 15 has power supplied thereto from power supply 19 or power supply 19' through contacts GS1–1 of gang switch GS1 and a diode $D_1$ which reduces the 24 volt output from the power supplies to 12 volts. The headphone sets 15 are connected to contacts GS1–1 in parallel with each other and contacts GS1–1 are connected to contacts GS1–2 through 5 so that when amplifiers $A_1$ and $S_1$ are being used, power supply 19 will be connected to headphone sets 15, and when amplifiers $A_2$ and $S_2$ are being used, power supply 19' will be connected to head phone sets 15.

From FIG. 2, it will be seen that any desired number of headphone sets 15 may be connected in circuit 14, however, only five such sets are shown for illustration. Each set 15 is connected to ground through a capacitor $C_1$ to insure separation of each signal generated in the headphone sets 15. It is to be understood, however, that the circuitry of each set 15 could be designed so that capacitors $C_1$ could be eliminated. Output $A_1^\circ$ or output $A_2^\circ$ is connected to inputs $I_p$ of sets 15 in parallel with each other so that the programmed material from channel A or A' may be simultaneously supplied to each set 15. A secondary input $I_s$ is supplied to set 15 from a musical instrument M, there being one instrument M associated with each set 15. It is to be understood, however, that inputs $I_s$ may be from other sources than the instruments M.

Each headphone set 15 has a secondary output $0_s$ connected to a monitoring amplifier $A_m$ through a monitor switch MS–and volume control $V_c$–1. The output of amplifier $A_m$ is connected to monitor speaker SR–located on console 10 as seen in FIG. 1.

Output $A_1^\circ$ or $A_2^\circ$ is also connected to a program speaker SR–2 located on console 10 as seen in FIG. 1. A microphone MC–1 is located on console 10 and is selectively connected to amplifier $A_1$ or $A_2$ through a switch SW–1 and contacts GS1–2 as seen in FIG. 2.

All of the circuit 14 with the exception of headphone sets 15 are housed in console 10. This facilitates setup of the system and transporting same.

Figure 3:
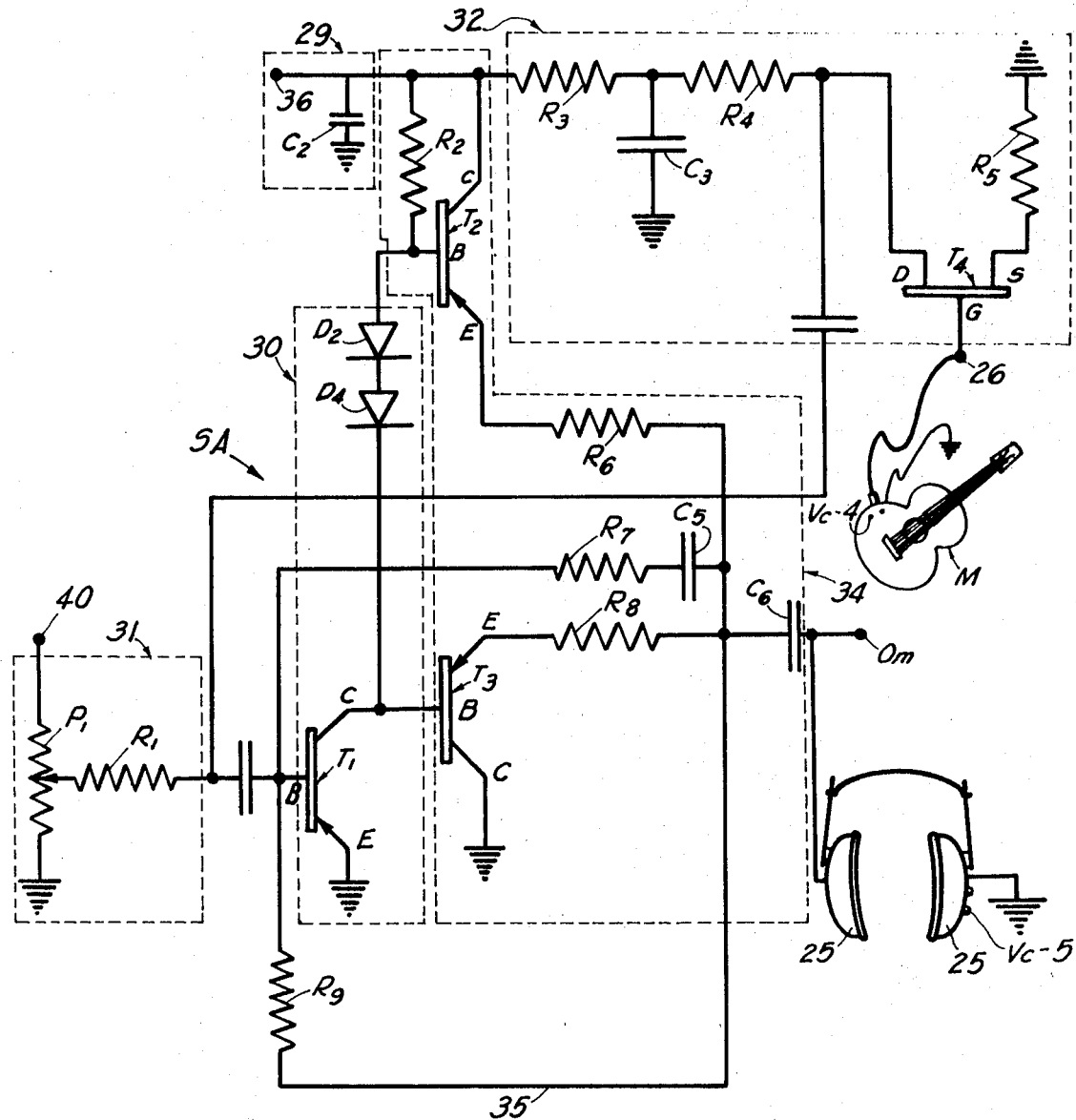
FIG. 3 is an electrical schematic drawing of the circuit of each headphone set of FIG. 2; and, FIG. 4 is an electrical schematic drawing of the other audio amplifiers of FIG. 2.

Referring particularly to FIG. 1, each headphone set 15 includes a pair of headphones 25. Each set 15 has a volume control $V_c$–5 associated therewith for individual control of the volume of the signal to the student wearing headphones 25. When the student is wearing the headphones 25 he can only hear what sounds are coming through the headphones 25. Therefore, it ill be seen that no special partitions are needed to isolate the students from each other. Each set 15 also has an input connection 26 for a student input from musical instrument M or other sound-to-electrical impulse source. Also included in each set 15 is a student amplifier SA as best seen in FIG. 3.

The amplifier SA includes a power input stage 29, a driving stage 30, a primary input stage 31, a secondary input stage 32, an output stage 34, and a feedback loop 35. Power input stage 29 includes connection 36 with the 12 volt supply from power supply 19 or 19' and a capacitor $C_2$. The output of stage 29 is connected to driving stage 30, output stage 34 and secondary input stage 32. Driving stage 30 includes diodes $D_2$ and $D_4$ and transistor T. Primary input stage 31 includes potentiometer $P_1$ which is mechanically connected to volume control $V_c$–5 and resistor $R_1$. Secondary input stage 32 includes resistors $R_3$, $R_4$, and $R_5$, capacitor $C_3$ and field effect transistors $T_4$. The output stage includes resistors $R_2$, $R_6$, $R_7$, and $R_8$; capacitors $C_5$ and $C_6$; and transistors $T_1$, $T_2$ and $T_3$. The feedback loop 35 includes resistor $R_9$ and is connected across the driving and output stages 30 and 34 to increase the gain of amplifier SA.

The driving stage 30 drives the output stage 34. The output of the secondary input stage 32 is superimposed on the output of the primary input stage 31 and then fed through the driving stage 30 to the output stage 34. The program output $A_1^\circ$ or $A_2^\circ$ is connected to the program input 40 of the stage 31. Therefore, it will be seen that the program signal has the student produced signal superimposed thereon and then amplified as output $0_m$ which is connected to headphones 25 and to the instructors's monitoring amplifier $A_m$.

Referring particularly to FIG. 4, each of the amplifiers $A_1$, $A_2$, $S_1$, $S_2$, and $A_m$ have the same internal circuit 41. The circuit 41 has a preamp stage 42, a driving stage 44 and a final or output stage 45. Connection 46 connects the preamp stage 42 with the 12 volt output of power supply 19 or 19' the input connection 48 connects the preamp stage with the appropriate output $0_1$, $0_1'$, $0_2$, $0_2'$, or $0_m$. Preamp stage 42 includes resistors $R_{10}$, $R_{11}$, $R_{12}$, $R_{13}$, and $R_{14}$; capacitors $C_8$, $C_9$, and $C_{10}$; potentiometer $P_2$; and transistor $T_5$.

Driving stage 44 includes resistors $R_{15}$, $R_{16}$, $R_{17}$, and $R_{18}$; capacitors $C_{11}$, $C_{12}$, and $C_{13}$; and transistor $T_6$. Final or output stage 45 includes resistors $R_{19}$, $R_{20}$, $R_{21}$, $R_{23}$, $R_{24}$, and $R_{25}$; capacitor $C_{14}$; diodes $D_4$ and $D_5$; and transistors $T_7$, $T_8$, and $T_9$. Driving and output stages 44 and 45 are powered from the 24 volt output of power supply 19 or 19' and the output of preamp stage 42 is fed through driving stage 44 and output stage 45 as output $A_1^\circ$, $A_2^\circ$, $S_1^\circ$, $S_2^\circ$, or $A_m^\circ$ depending on which of the amplifiers is being considered.

It is to be understood that the amplifier circuits shown in the drawings are for illustration only and other equivalent circuits may be used without departing from the scope of the inventive concept.

OPERATION

From the foregoing description it will be seen that the apparatus of the invention is set up with a properly prepared program tape 18 on the tape deck 12 or 12'. Since one of the tape decks, one of the power supplies, one of the audio amplifiers, and one of the sync amplifiers are used at the time, the operation will be described using deck 12, amplifiers $A_1$ and $S_1$, and power supply 19, it being understood that their corresponding standby components could be used instead.

The program tape 18 is loaded on tape deck 12 and the proper slides are loaded in projector 11. The headphone sets 15 are connected to console 10 and the instruments M are connected to sets 15. When the students are wearing the sets 15, the system is ready for operation. The instructor at console 10 starts tape 18 which generates an advancing signal $0_2$ synchronized with the program signal $0_1$. Signal $0_2$ causes projector 11 to advance through amplifier S, and display the proper visual signal on screen 16 for the students to see while the students hear the program material through amplifiers $A_1$ and SA. The master volume level is set by the instructor with volume control $V_c$-2 and each student can adjust the same to his individual requirements with volume control $V_c$—5.

At the appropriate time, the student is told to duplicate or complement the program material he is hearing on his musical instrument M. He then adjusts the input volume of input $I_s$ with volume control $V_c$-4 and attempts to carry out the program instructions while listening to his own input $I_s$ in conjunction with the program input $I_p$.

The instructor can selectively listen to any student individually by closing the appropriate switch MS–and adjusting the volume of output $A_m°$ with volume control $V_c$-1. If the instructor feels that he should communicate directly with the students, he closes switch SW–and speaks into microphone MC-1. While he speaks to all students simultaneously, he may identify the particular student verbally to whom his remarks are addressed.

While specific embodiments of the invention have been disclosed herein, it is to be understood that full use may be made of modifications, substitutions and equivalents without departing from the scope of the inventive concept as set forth hereinabove.

What is claimed as invention is:

1. Audiovisual multiple student teaching apparatus including:
   a. first means for selectively presenting a programmed visual display to each of the students;
   b. second means, including a pair of headphones, for presenting a programmed audible signal to each student;
   c. third means for immediately superimposing a secondary audible signal generated by a particular student onto the programmed audible signal presented to that student, through said headphones;
   d. control means for synchronizing the visual display presented to each student with the programmed audible signal presented to each student;
   e. means for selectively presenting any one of said secondary audible signals at a remote station; and
   f. means for superimposing an auxiliary audible signal onto said programmed audible signal presented to each student.

2. The apparatus of claim 1 wherein said second means includes a tape deck having two output channels, a recording medium having two channels carried on said tape deck, one of said channels having the master programmed information thereon, said tape deck producing one of its outputs in accordance with the programmed information on said one channel of said medium, and amplification means having its input connected to said one of the outputs of said tape deck, said headphones being connected to the output of said amplification means to convert the output of said amplification means into an audible signal for the signal for the student wearing said headphones, said amplification means including a volume control for regulating the amplitude of the output of said amplification means.

3. The apparatus of claim 1 wherein said third means includes, a conversion device for converting an audible signal generated by the student wearing said headphones into a secondary input operatively connected to said amplification means, said amplification means being constructed and arranged to superimpose said secondary input onto one of the outputs of said tape deck; and secondary volume control means operatively connected to said conversion device for selectively adjusting the amplitude of said secondary signal.

4. An audiovisual multiple student teaching device comprising:
   a projection device having an advance mechanism for projecting programmed visual images to the students,
   a two-channel tape deck;
   a two-channel tape operably carried by said tape deck and including a first channel having a programmed master signal thereon and a second channel having a synchronizing signal thereon, said tape deck constructed and arranged to produce a first output in accordance with said programmed master signal and a second output in accordance with said synchronizing signal;
   an audio amplifier having its input selectively connected to said first output of said tape deck;
   a sync amplifier having its input selectively connected to said second output of said tape deck, and its output operatively connected to said advance mechanism of said projection device to cause said device to display the next successive visual image to the students in accordance with said synchronizing signal;
   a plurality of student amplifiers having their inputs connected in parallel to the output of said audio amplifier, each of said student amplifiers operatively connected to a pair of headphones for a particular student;
   a plurality of student input conversion means, each of said conversion means operatively associated with a particular student amplifier and generating a secondary input signal to said particular student amplifier in response to an audible signal generated by the students wearing said pair of headphones connected to said particular student amplifier, said student amplifier superimposing said secondary input signal onto said output from said audio amplifier and supplying same as an amplified output to said headphone set;
   a monitoring amplifier;
   switching means selectively connecting said amplified output of each of said student amplifiers to said monitoring amplifier;
   a speaker operatively connected to the output of said monitoring amplifier to convert said amplified output from the selected one of said student amplifiers into an audible output;
   a microphone;
   a selector switch selectively connecting said microphone to the input of said audio amplifier to superimpose a signal from said microphone onto the output of said audio amplifiers; and,
   power supply means for supplying amplification power to said audio, sync, student, and monitoring amplifiers.